US010160535B2

(12) United States Patent
Christman

(10) Patent No.: US 10,160,535 B2
(45) Date of Patent: Dec. 25, 2018

(54) FUSE PIN MODEL DIFFERENTIAL OR EXCLUSION FEATURE

(71) Applicant: The Boeing Company, Chicago, IL (US)

(72) Inventor: David B. Christman, Ravensdale, WA (US)

(73) Assignee: THE BOEING COMPANY, Chicago, IL (US)

( * ) Notice: Subject to any disclaimer, the term of this patent is extended or adjusted under 35 U.S.C. 154(b) by 152 days.

(21) Appl. No.: 15/184,128

(22) Filed: Jun. 16, 2016

(65) Prior Publication Data

US 2017/0137117 A1    May 18, 2017

Related U.S. Application Data

(63) Continuation-in-part of application No. 14/942,422, filed on Nov. 16, 2015.

(51) Int. Cl.
| | | |
|---|---|---|
| *B64D 45/04* | (2006.01) | |
| *B64C 25/00* | (2006.01) | |
| *F16B 13/00* | (2006.01) | |
| *F16B 19/00* | (2006.01) | |

(52) U.S. Cl.
CPC ............ *B64C 25/001* (2013.01); *B64D 45/04* (2013.01); *F16B 13/00* (2013.01); *F16B 19/00* (2013.01)

(58) Field of Classification Search
CPC .......... B64D 47/00; F16B 13/00; F16B 19/00; B64C 25/001
See application file for complete search history.

(56) References Cited

U.S. PATENT DOCUMENTS

| | | | | |
|---|---|---|---|---|
| 2,468,669 A | * | 4/1949 | Holmes | B60D 1/155 180/14.1 |
| 3,982,408 A | * | 9/1976 | Wright | F16D 3/185 464/154 |

(Continued)

FOREIGN PATENT DOCUMENTS

GB          179294          7/1957

OTHER PUBLICATIONS

European Patent Office; Extended European Search Report; European Patent Application No. 16198657.5; dated Mar. 17, 2017.

(Continued)

*Primary Examiner* — Michael H Wang
(74) *Attorney, Agent, or Firm* — Parsons Behle & Latimer

(57) ABSTRACT

A fastening system having differentiable components includes a first bushing with a first mating feature to be inserted within a first receiver. A first fuse pin with a second mating figure and being configured to shear upon the application of a first predetermined load is configured to be inserted into the first receiver and mate with the first mating feature of the first bushing. The first and second mating features correspond and permit the insertion of the first fuse pin into the first bushing within the first receiver to selectively connect components. The first bushing may prevent the complete insertion of a second fuse pin having a third mating feature into the first receiver. A second bushing having a fourth mating feature may permit the complete insertion of the second fuse pin into the second bushing positioned within a second receiver.

20 Claims, 10 Drawing Sheets

(56) References Cited

U.S. PATENT DOCUMENTS

| | | | | |
|---|---|---|---|---|
| 4,087,062 A * | 5/1978 | Masclet | ............... | B64C 25/00 |
| | | | | 114/279 |
| 4,248,105 A * | 2/1981 | Downing | ............... | B64C 13/34 |
| | | | | 244/213 |
| 4,273,006 A * | 6/1981 | Woodbury | ............... | B64C 13/28 |
| | | | | 244/213 |
| 4,392,622 A * | 7/1983 | McClaflin | ............... | B64C 25/10 |
| | | | | 244/102 A |
| 4,392,623 A * | 7/1983 | Munsen | ............... | B64C 25/10 |
| | | | | 244/102 R |
| 4,815,678 A * | 3/1989 | Gawne | ............... | B64C 25/00 |
| | | | | 244/100 R |
| 6,007,267 A * | 12/1999 | VanHorn | ............... | B66C 15/00 |
| | | | | 403/2 |
| 6,679,452 B1 * | 1/2004 | Cottet | ............... | B64C 1/0009 |
| | | | | 244/102 R |
| 7,775,093 B2 * | 8/2010 | Cooper | ............... | G01M 5/0041 |
| | | | | 403/2 |
| 8,800,382 B2 * | 8/2014 | Bennett | ............... | B64C 25/00 |
| | | | | 73/802 |
| 2004/0237749 A1 | 12/2004 | Green | | |
| 2010/0284764 A1 | 11/2010 | Chen | | |
| 2014/0042268 A1 * | 2/2014 | Sandy | ............... | B64D 27/26 |
| | | | | 244/54 |

OTHER PUBLICATIONS

European Patent Office; European Search Report; European Patent Application No. 16 198 657.5; dated Jan. 8, 2018.

* cited by examiner

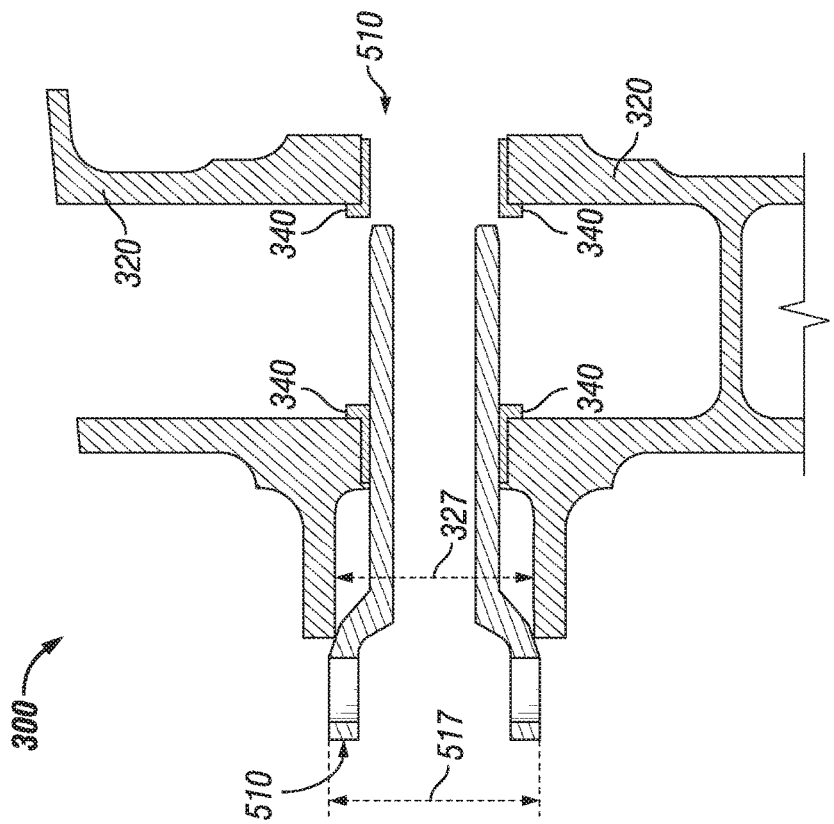
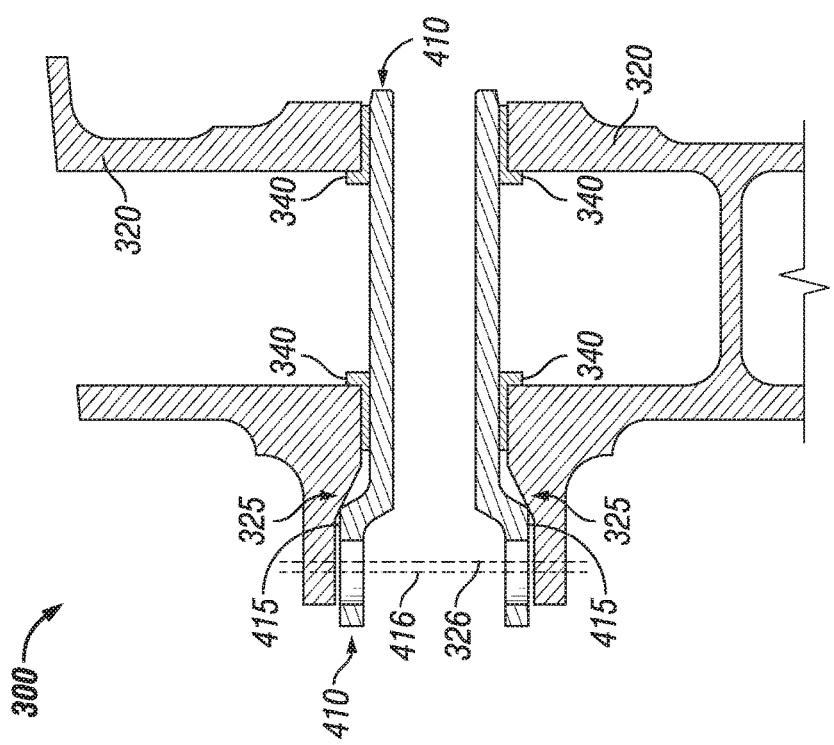

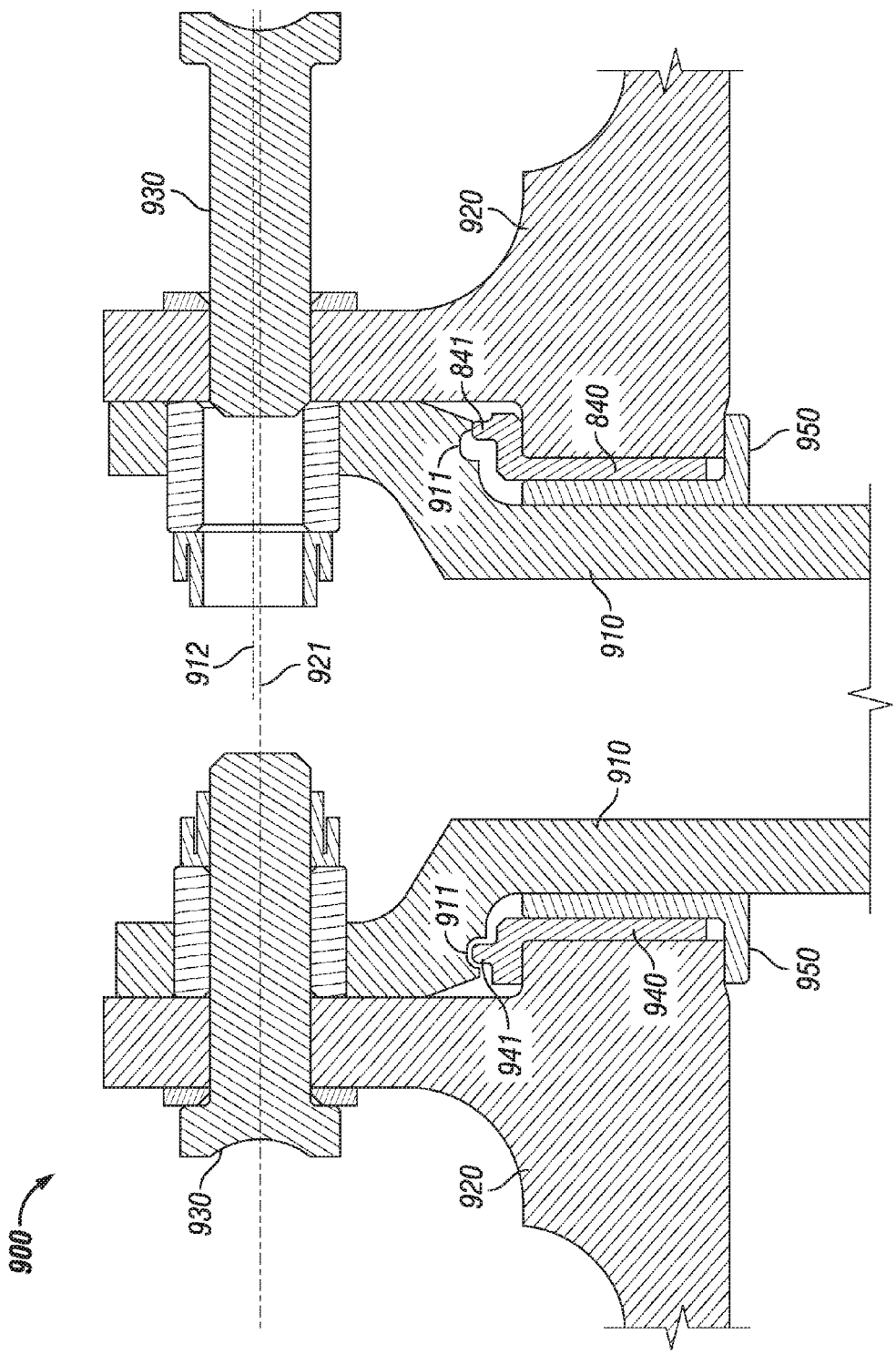

FUSE PIN MODEL DIFFERENTIAL OR EXCLUSION FEATURE

RELATED APPLICATIONS

The present disclosure is a continuation-in-part application of U.S. patent application Ser. No. 14/942,422, entitled Fuse Pin Model Differential or Exclusion Feature filed on Nov. 16, 2015, which is incorporated by reference herein in its entirety.

FIELD OF THE DISCLOSURE

The embodiments described herein relate to systems and methods for a fastening system having differentiable components that prevent the use of the incorrect fastening components to secure together two or more parts.

BACKGROUND

Description of the Related Art

A fastening system may be used to selectively connect together two or more components or parts. The system may include a fuse pin and a receiver that where inserted together selectively connect together two or more components. The fuse pin may be configured to shear upon the application of a predetermined force in an effort to prevent damage to other components of a system. For example, a fuse pin configured to shear upon the application of a predetermined force may connect a gear beam to a cantilevered support mounted to a spar of an aircraft. If the aircraft has a particularly hard landing or the landing gear impacts an object, the fuse pin is configured to shear if the load is at or above a predetermined amount. The shearing of the fuse pin may prevent other components from being damaged due to the hard landing and/or impact. For example, the shearing of the fuse pin may help to prevent damage to the fuel box on the wing of the aircraft.

The use of fuse pins to connect aircraft components is known. However, a first model of an aircraft may use a first fuse pin configured to shear at a first predetermined load and a second model of an aircraft may use a second fuse pin configured to shear at a second predetermined load, which differs from the first predetermined load. Although the first and second fuse pins are configured to shear on different loads, the visual appearance may be similar, which potentially could lead to the installation of the wrong fuse pin in an aircraft. Alternatively, the wrong fuse pin could be installed into an aircraft by mistake even if the fuse pins differ in appearance. The installation of the wrong fuse pin into an aircraft system may be problematic as would be appreciated by one of ordinary skill in the art. For example, a wrong fuse pin may shear at a lower load than intended or may not shear when intended. Thus, it would be beneficial to prevent the insertion of the wrong fuse pin into the receiver of a fastener system.

SUMMARY

The present disclosure is directed to a method and system that address at least some of the problems and disadvantages discussed above.

One embodiment is a fastening system having differentiable components comprising a first fuse pin configured to shear upon the application of a first predetermined load, the first fuse pin having a first mating feature. The system comprises a first receiver configured to receive the first fuse pin, the first receiver having a second mating feature, wherein the second mating feature corresponds to the first mating feature to permit the insertion of the first fuse pin into the first receiver to selectively connect a first component to a second component. The first and second components may be parts of an aircraft. The first component may comprise a dog house assembly and the second component may comprise a gear beam. The insertion of the first fuse pin into the first receiver may align a plurality of apertures in the first fuse pin with a plurality of apertures in the first receiver.

The system may comprise a plurality of fasteners inserted through the apertures of the first fuse pin and the first receiver to selectively connect the first fuse pin to the first receiver. The system may include a second fuse pin configured to shear upon the application of a second predetermined load, the second fuse pin having a third mating feature, wherein the third mating feature and the second mating feature may prevent the insertion of the second fuse pin into the first receiver to selectively connect the first component to the second component. The second predetermined load may differ from the first predetermined load. The first fuse pin may be configured to selectively connect together components of a first aircraft and the second fuse pin may be configured to selective connect together components of a second aircraft, the second aircraft and the first aircraft not being identical. The first mating feature may be the shape of a head of the first fuse pin, a tab, a groove, a slot, a projection, a ridge, a valley, or an outer diameter. The third mating feature may be the shape of a head of the second fuse pin, a tab, a groove, a slot, a projection, a ridge, a valley, or an outer diameter and wherein the third mating feature prevents the insertion of the second fuse pin into the first receiver to selectively connect the first component to the second component. The second mating feature may be a mirror image of the first mating feature.

Another embodiment of the present disclosure is a method of providing a fastening system having differentiable components. The method comprises providing a first fuse pin, the first fuse pin configured to shear upon the application of a first predetermined load and providing a first receiver configured to receive the first fuse pin. The method comprises varying a feature on the first fuse pin with respect to the same feature on a second fuse pin and varying a feature of the first receiver to correspond with the feature varied on the first fuse pin, wherein the first fuse pin may be inserted into the first receiver.

The method may comprise inserting the first fuse pin into the first receiver to selectively connect together a first component and a second component. The first and second components may be parts of an aircraft. The insertion of the first fuse pin into the first receiver may align a plurality of apertures of the first fuse pin with a plurality of apertures of the first receiver and further comprising inserting a plurality of fasteners through the plurality of apertures to selectively connect the first fuse pin to the first receiver. The method may include providing the second fuse pin, the second fuse pin configured to shear upon the application of a second predetermined load, the second predetermined load differing from the first predetermined load and varying a feature on the second fuse pin, wherein the varied feature prevents the insertion of the second fuse pin into the first receiver to selectively connect together a first component and a second component.

Varying the feature of the first fuse pin may comprise providing a tab and varying the feature of the first receiver may comprise providing a groove, wherein the tab of the first fuse pin fits within the groove of the first receiver when the first fuse pin is inserted into the first receiver. Varying the feature of the first fuse pin may comprise varying a slope of a portion of the first fuse pin with respect to a slope of the corresponding portion of the second fuse pin and varying the feature of the first receiver may comprise varying a slope of a portion of the first receiver to mate with the slope of the varied portion of the first fuse pin. The slope of the corresponding portion of the second fuse pin may prevent the insertion of the second fuse pin into the first receiver.

Another embodiment is a fastening system having differential components. The system comprises a first fuse pin, the first fuse pin having a first mating feature and a first receiver configured to receive the first fuse pin, the first receiver having a second mating feature. The system comprises a second fuse pin, the second fuse pin having a third mating feature, wherein the second mating feature corresponds to the first mating feature to permit the insertion of the first fuse pin into the first receiver to selectively connect a first component to a second component, and wherein the third mating feature in combination with the second mating feature prevents the insertion of the second fuse pin into the first receiver to selectively connect the first component to the second component.

One embodiment is a fastening system having differential components comprising a first bushing having a first mating feature positioned within an opening of a first receiver and a first fuse pin configured to shear upon an application of a first predetermined load, the first fuse pin having a second mating feature. The second mating feature of the first fuse pin corresponds to the first mating feature of the first bushing to permit insertion of the first fuse pin into the first bushing within the first receiver to selectively connect a first component to a second component.

The first and second components may be parts of an aircraft. The first component may be a dog house assembly and the second component may be a gear beam. The insertion of the first fuse pin into the first receiver may align a plurality of apertures in the first fuse pin with a plurality of apertures in the first receiver. A plurality of fasteners may be inserted through the apertures of the first fuse pin and the first receiver to selectively connect the first fuse pin to the first receiver. The system may include a second fuse pin configured to shear upon an application of a second predetermined load, the second fuse pin having a third mating feature, wherein the third mating feature of the second fuse pin and the first mating feature of the first bushing may prevent insertion of the second fuse pin into the first bushing within the first receiver to selectively connect the first and second components.

The second predetermined load may differ from the first predetermined load. The first pin may be configured to selectively connect together components of a first aircraft and the second fuse pin may be configured to selectively connect together components of a second aircraft that is not identical to the first aircraft. The system may include a second bushing having a fourth mating feature positioned within an opening of a second receiver, wherein the fourth mating feature corresponds to the third mating feature to permit insertion of the second fuse pin into the second bushing within the second receiver to selectively connect two components. The second mating feature of the first fuse pin and the fourth mating feature of the second bushing may prevent insertion of the first fuse pin into the second bushing within the second receiver to selectively connect two components.

One embodiment is a method of providing a fastening system having differential components. The method comprises providing a first bushing, providing a first receiver configured to receive the first bushing, and providing a first fuse pin configured to shear upon an application of a first predetermined load, wherein the first bushing positioned within the first receiver is configured to receive the first fuse pin. The method includes varying a feature on the first bushing with respect to the same feature on a second bushing and varying a feature on the first fuse pin to correspond to the feature varied on the first bushing, wherein the first fuse pin may be inserted into the first bushing.

The method may include inserting the first fuse pin into the first bushing within the first receiver to selectively connect together a first component and a second component. The first and second may be parts of an aircraft. The insertion of the first fuse pin into the first bushing positioned within the first receiver may align a plurality of apertures of the first fuse pin with a plurality of apertures of the first receiver and the method may include inserting a plurality of fasteners through the plurality of apertures to selectively connect the first fuse pin to the first receiver. The method may include providing a second fuse pin configured to shear upon an application of a second predetermined load, the second predetermined load differing from the first predetermine load and may include varying a feature on the second fuse pin, wherein the varied feature prevents insertion of the second fuse pin into the first bushing to selectively connect together a first component and a second component.

Varying the feature of the first bushing may include providing a projection and varying the feature of the first fuse pin may include providing a recess, wherein the projection of the first bushing may fit within the recess of the first fuse pin when the first fuse pin is inserted into the first bushing. Varying the feature of the first bushing may include providing a projection and varying the feature of the first fuse pin may include providing a shoulder, wherein the projection of the first bushing may mate with the shoulder of the first fuse pin when the first fuse pin is inserted into the first bushing. The method may include providing a second bushing and providing a second receiver configured to receive the second bushing, wherein the varied feature on the second bushing prevents insertion of the first fuse pin into the second bushing positioned within the second receiver.

One embodiment is a fastening system having differential components comprising a first bushing having a first mating feature and a first fuse pin having a second mating feature. The system includes a first receiver configured to receive the first bushing within an opening, the first bushing configured to receive the first fuse pin and a second fuse pin having a third mating feature. The second mating feature corresponds to the first mating feature to permit insert of the first fuse pin into the first bushing within the first receiver to selectively connect a first component to a second component. The third mating feature in combination with the first mating feature prevents the insertion of the second fuse pin into the first bushing within the first receiver to selectively connect the first component to the second component.

The system may include a second bushing having a fourth mating feature and a second receiver configured to receive the second bushing within an opening, the second bushing configured to receive the second fuse pin. The third mating feature of the second fuse pin may correspond to the fourth mating feature of the second bushing to permit insertion of the second fuse pin into the second bushing within the second receiver to selectively connect two components. The fourth mating feature of the second receiver in combination with the second mating feature of the first fuse pin may prevent the insertion of the first fuse pin into the second bushing within the second receiver.

BRIEF DESCRIPTION OF THE DRAWINGS

FIG. 7 is a schematic of a fastening system showing the mating features preventing the insertion of a fuse pin within a receiver.

FIG. 8 is a schematic of a fastening system showing the mating features preventing the insertion of a fuse pin within a receiver.

FIG. 16 is a schematic of a fastening system showing the mating features permitting and preventing the insertion of a fuse pin into a receiver.

Figure 1:
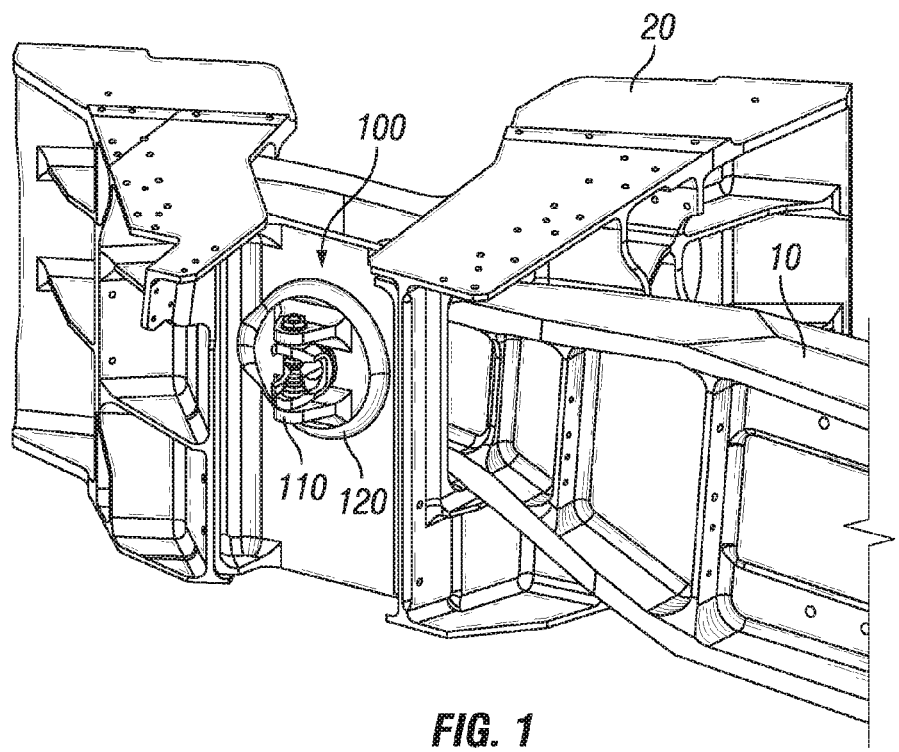
FIG. 1 shows an embodiment of a fastening system selectively connecting together two components.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows one embodiment of a fastening system 100 that is selectively connecting a first component 10 to a second component 20. The first and second components 10 and 20 may be parts of an aircraft. For example, the first component 10 may be a gear beam and the second component 20 may be a dog house, which may be a three piece cantilever assembly. A first fuse pin 110 is inserted into a receiver 120 of the second component 20 to the first component 10. The fuse pin 110 may be configured to shear upon the application of a predetermined load or force disconnecting the first component 10 from the second component 20. For example, the fuse pin 110 may be configured to shear upon the application of a first load when an aircraft has a hard landing that exerts a force on the landing gear that exceeds first predetermined amount, which will cause the fuse pin 110 to shear. The fuse pin 110 may be configured to shear to prevent damage to other components of the aircraft due to a hard landing and/or an impact with an object.

Figure 2:
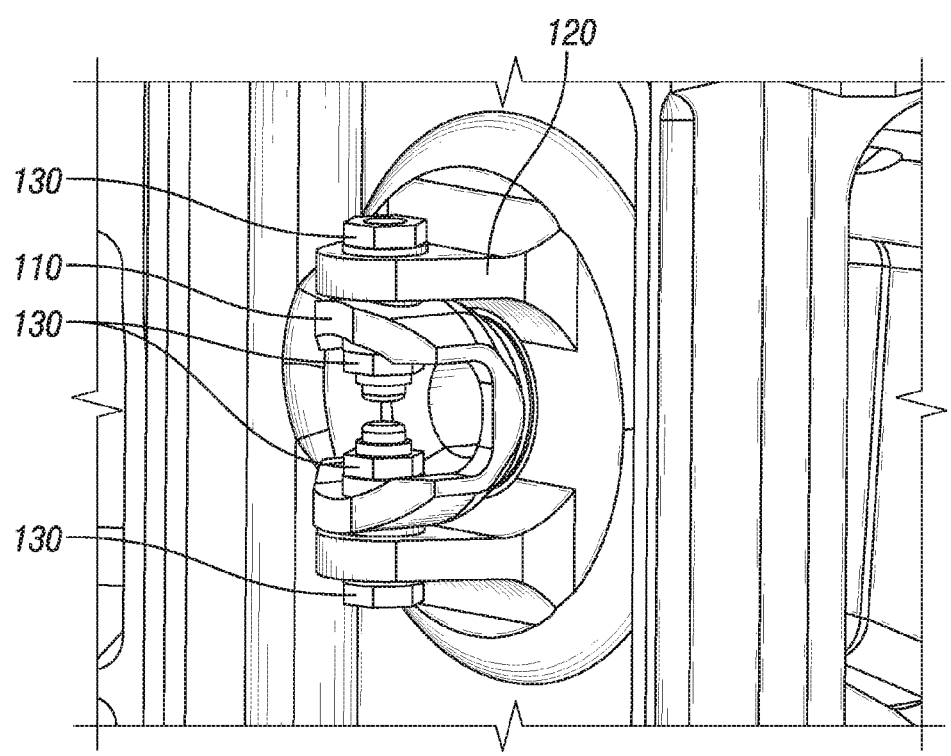
FIG. 2 is a close-up view of the fuse pin and receiver of the fastening system of FIG.

FIG. 2 shows a close-up view of the fuse pin 110 inserted into the receiver 120. Fasteners 130 may be inserted through apertures (best shown in FIG. 3 and FIG. 4) in the fuse pin 110 and receiver 120 to connect the fuse pin 110 to the receiver 120. The shape and configuration of the fuse pin 110 and receiver 120 is for illustrative purposes only and may be varied as would be appreciated by one of ordinary skill in the art having the benefit of this disclosure. The fastening system 100 includes a fuse pin 110 having a first mating feature and a receiver 120 having a second mating feature. The first and second mating features correspond to permit the insertion of the fuse pin 110 into the receiver 120 to selectively connect the first and second components 10 and 20 together as discussed herein. The second mating feature however prevents the inadvertent insertion of a second fuse pin into the receiver 120 in place of the first fuse pin as discussed herein. The first and second mating features may be varied to permit the insertion of the first fuse pin 110, but prevent the insertion of a second fuse pin. For example, the first and second mating features may be, but are not limited to, the shape of a head of the first fuse pin, a tab, a groove, a slot, a projection, a ridge, a valley, or an outer diameter. The second fuse pin may have a third mating feature that differs from the first mating feature of the first fuse pin and thus, does not correspond to the second mating feature of the receiver. Thus, the third mating feature prevents the insertion of the second fuse pin into the receiver 120.

Figure 3:
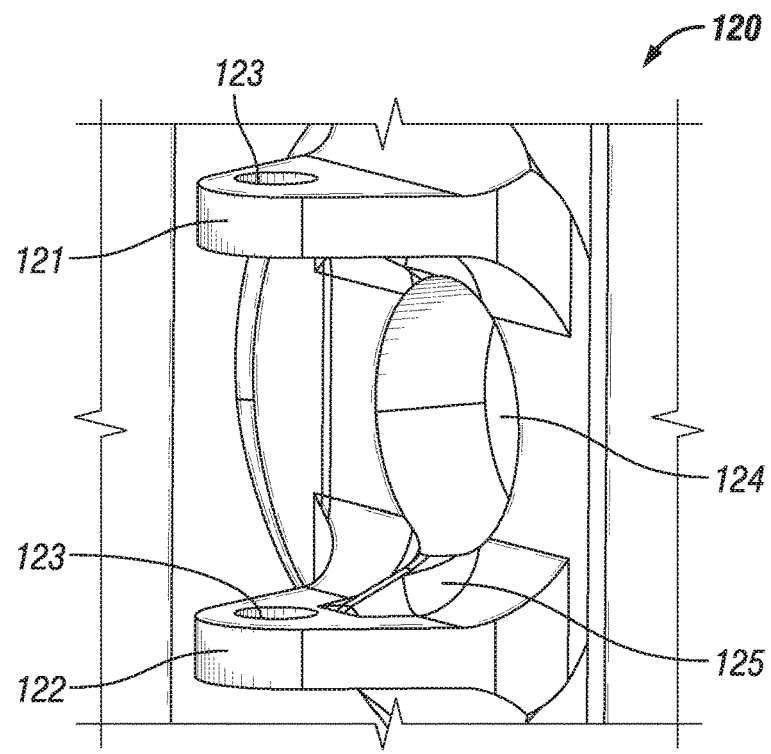
FIG. 3 is a close up view of an embodiment of a receiver of a fastening system.

FIG. 3 shows an embodiment of a receiver 120 that includes a first flange 121 and a second flange 122. The first and second flanges 121 and 122 each include an aperture 123 that permits the insertion of a fastener 130 (shown in FIG. 2) to connect the receiver 120 to a first fuse pin 110. The receiver 120 includes an opening 124 for the insertion of the projection 114 (shown in FIG. 4) of the fuse pin 110. The receiver 120 includes a second mating feature 125 that permits the insertion of a first fuse pin 110, but prevents the insertion of the second fuse pin. The second mating feature may be a tab 125 as shown in FIG. 3. The tab 125 of the receiver 120 may mate with a first mating feature 115, which may be a slot or groove (shown in FIG. 4) on the head of the first fuse pin 110. The tab 125 may prevent the insertion into the receiver 120 of a fuse pin that does not include a corresponding groove or slot as would be appreciated by one of ordinary skill in the art having the benefit of this disclosure. Alternatively, the second mating feature may be a shoulder having a specific slope, a valley, a groove, or other feature that corresponds to the first mating feature of a specific fuse pin 110.

Figure 4:
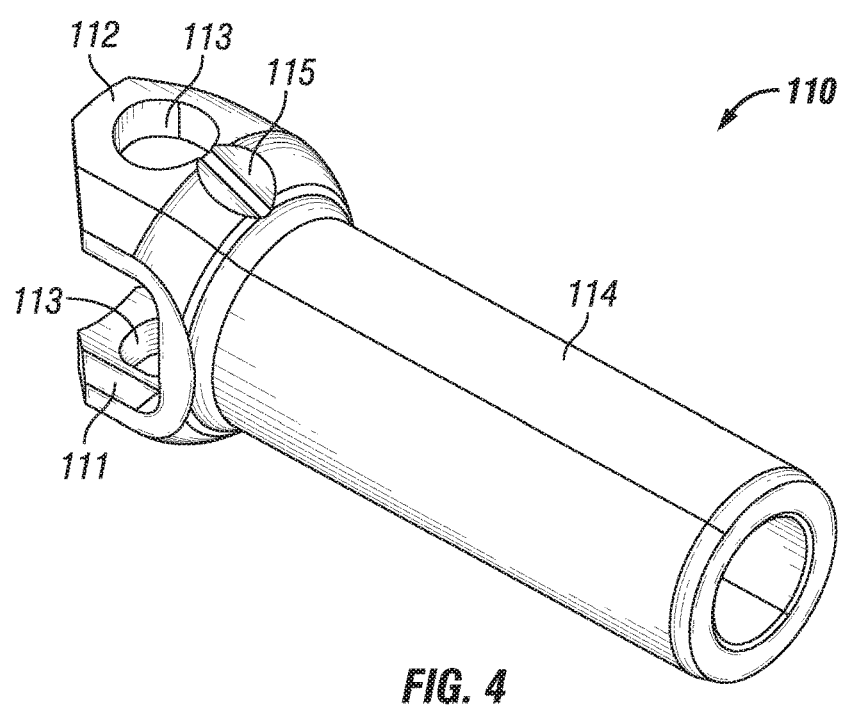
FIG. 4 shows an embodiment of a fuse pin of a fastening system.

FIG. 4 shows an embodiment of a fuse pin 110. The fuse pin 110 includes a first flange 111 and a second flange 112 each including an aperture 113 that permits the insertion of a fastener 130 (shown in FIG. 2) to selectively connected the fuse pin 110 to a specified receiver 120. As discussed herein, the fuse pin 110 may be designed to shear upon the application of a predetermined load when connected to the receiver 120. The fuse pin 110 includes a projection 114 that is inserted through the receiver 120. The fuse pin 110 includes a first mating feature 115, which may be a groove as shown in FIG. 4, that corresponds to a second mating feature on the receiver 120 into which the fuse pin 110 is intended to be inserted. The first mating feature may be the diameter of the head of the fuse pin, a shoulder having a specific slope, a valley, a groove, or other feature that corresponds to the second mating feature of a specific receiver 120 as would be appreciated by one of ordinary skill having the benefit of this disclosure.

Figure 5:
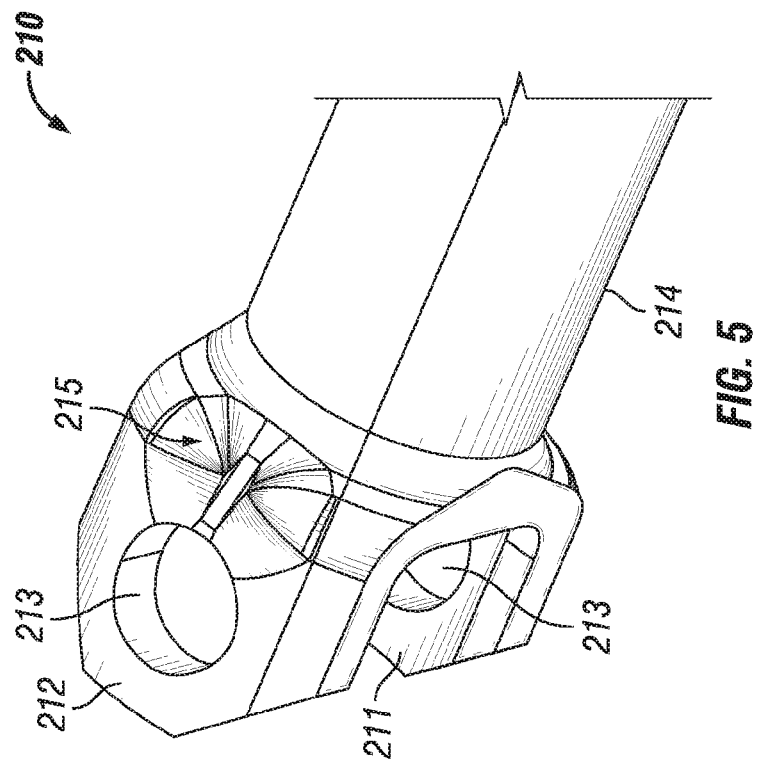
FIG. 5 is a partial view of an embodiment of a fuse pin of a fastening system.

FIG. 5 shows a partial view of an embodiment of a fuse pin 210. The fuse pin 210 includes first and second flanges 211 and 212 having fastener apertures 213 with a projection 214 for the insertion of the fuse pin 210 into a receiver. The fuse pin 210 includes a first mating feature 215, which for illustrative purposes differs from the first mating feature shown in FIG. 4.

Figure 6:
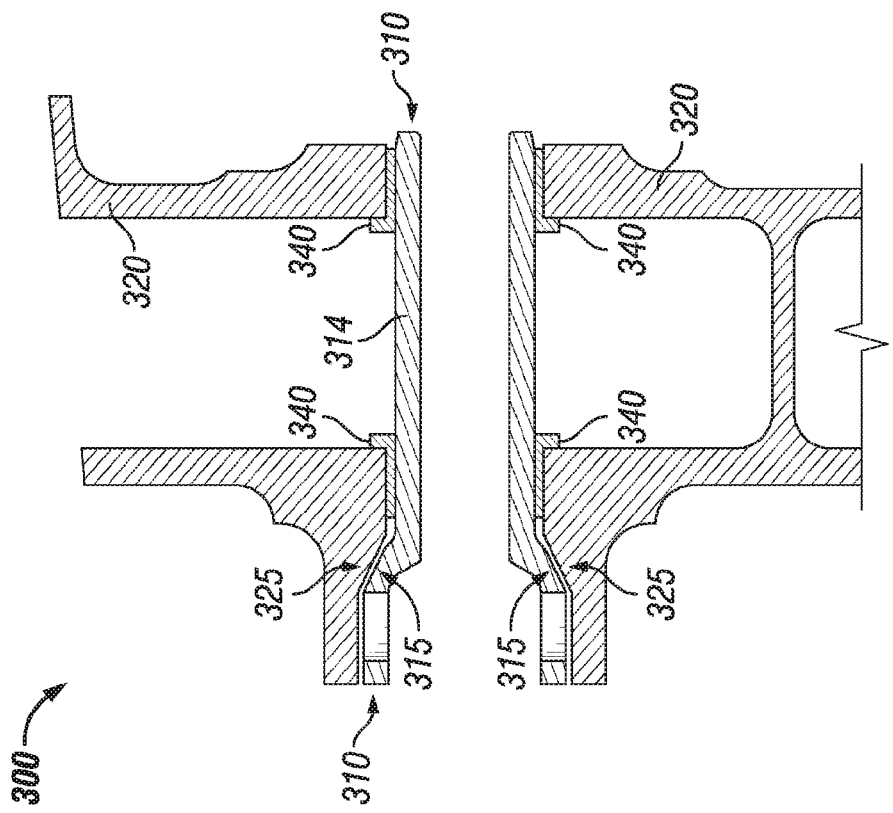
FIG. 6 is a schematic of a fastening system showing a fuse pin positioned within a receiver.

FIG. 6 shows a schematic of a fastener system 300 having differentiable components. The schematic shows a fuse pin 310 inserted into a receiver 320. The system 300 may include bushings 340 positioned between the fuse pin 310 and the receiver 320. The first mating feature 315 of the fuse pin 310 corresponds to the second mating feature 325 of the receiver 320 permitting the insertion of the projection 314 of the fuse pin 310 into the receiver 320. The shape of the first mating feature 315 mirrors the shape of the second mating feature 325 which permits the complete insertion of the fuse pin 310 into the receiver 320.

FIG. 7 shows the fastening system 300 with a second fuse pin 410 inserted in the receiver 320. The second fuse pin 410 is not configured to be used with the receiver 320 of the fastening system 300. The shoulder or third mating feature 415 of the second fuse pin 410 prevents the complete insertion of the second fuse pin 410 into the receiver 320. Although the fuse pin 410 is partially inserted into the receiver 320, the mating features 325 and 415 do not correspond and thus, the centerline 416 of the fastener aperture of the second fuse pin 410 does not align with the centerline 326 of the receiver preventing the insertion of fasteners 130 (shown in FIG. 2) to secure the second fuse pin 410 to the receiver 320. Thus, the mating features 325 and 415 prevents the insertion of the second fuse pin 410 with the wrong receiver 320 as discussed herein. The first and second mating features may be varied to permit the insertion of the first fuse pin 11, but prevent the insertion of a second fuse pin as discussed herein.

FIG. 8 shows the fastening system 300 with a third fuse pin 510 partially inserted in the receiver 320. The second fuse pin 510 is not configured to be used with the receiver 320 of the fastening system 300. The schematic shows the third fuse pin 510 partially inserted into the receiver 320 for illustrative purposes only. As shown in the schematic, the outer diameter 517 of the head of the third fuse pin 510 is larger than the inner diameter 327 of the receiver 320. Thus, the mating feature (e.g. the outer diameter) of the third fuse pin 510 would prevent or at least decrease the likelihood of the insertion of the third fuse pin 510 into the wrong receiver 320. The fastening system 300 may include multiple fuse pins that are configured to shear at a predetermined load that differs from the first fuse pin 410 configured to be inserted in the receiver 320. As would be appreciated by one of ordinary skill in the art having the benefit of this disclosure, the multiple fuse pins may each include a mating feature that prevents and/or decreases the chance of the insertion of the multiple fuse pins into the receiver 320 and does permit the insertion of each fuse pin into a receiver it is configured to be used with to connect together two or more components.

Figure 9:
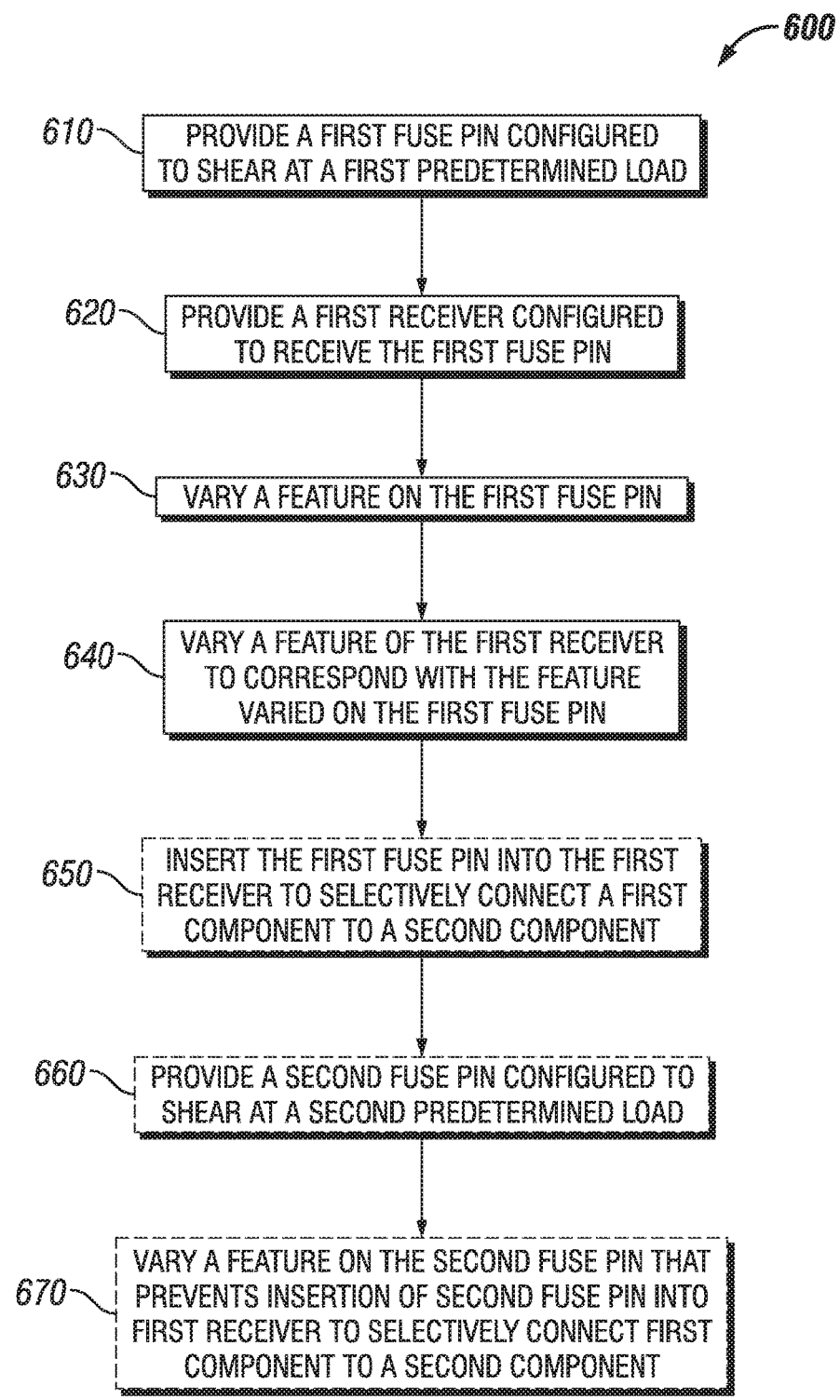
FIG. 9 is a flow chart showing one embodiment for a method of providing a fastening system having differentiable components.

FIG. 9 shows a flow chart showing one embodiment for a method 600 of providing a fastening system having differentiable components. A first fuse pin configured to shear at a first predetermined load is provided as step 610. As discussed above, the fuse pin may be configured to shear upon a set load to protect damage to other components upon the application of the predetermined load. A first receiver configured to receive the first fuse pin is provided at step 620. A feature on the first fuse pin is varied with respect to the same feature on a second fuse pin in step 630. In step 640, a feature of the first receiver is varied to correspond to the feature varied on the first fuse pin to permit the first fuse pin to be inserted into the first receiver. The varying of features in steps 630 and 640 may decrease the chance that a fuse pin not intended to be used with the first receiver may be inserted into the first receiver to connect together two or more components.

The method 600 may include step 650, inserting the first fuse pin into the first receiver to selectively connect a first component to a second component. The first and second components may be parts of an aircraft. The insertion of the first fuse pin into the first receiver may selectively connect more than two components together. The insertion of the first fuse pin into the first receiver may align a plurality of apertures of the first fuse pin with a plurality of apertures of the first receiver to permit the insertion of fasteners through the apertures to selectively connect the first fuse pin to the first receiver. The method 600 may include providing a second fuse pin configured to shear at a second predetermined load at step 660. The second predetermined load may differ from the first predetermined load. The method 600 may include varying a feature on the second fuse pin in step 670. Varying the feature in step 670 may prevent or decrease the chance of the insertion of the second fuse pin into the first receiver to selectively connect together a first component and a second component. Varying the feature in step 630 may include providing a tab and varying the feature in step 640 may include providing a groove, wherein the tab may fit within the groove when the first fuse pin is inserted in the receiver. Alternatively, the receiver may include a shaped protrusion and the first fuse pin may include a correspondingly shaped recess that mate together when the inserted together as would be appreciated by one of ordinary skill in the art having the benefit of this disclosure. Varying the feature in step 630 may include varying a slope of a portion of the first fuse pin and varying the feature in step 640 may include varying a slope of a portion of the first receiver to mate with the slope of the varied portion of the first fuse pin.

Figure 11:
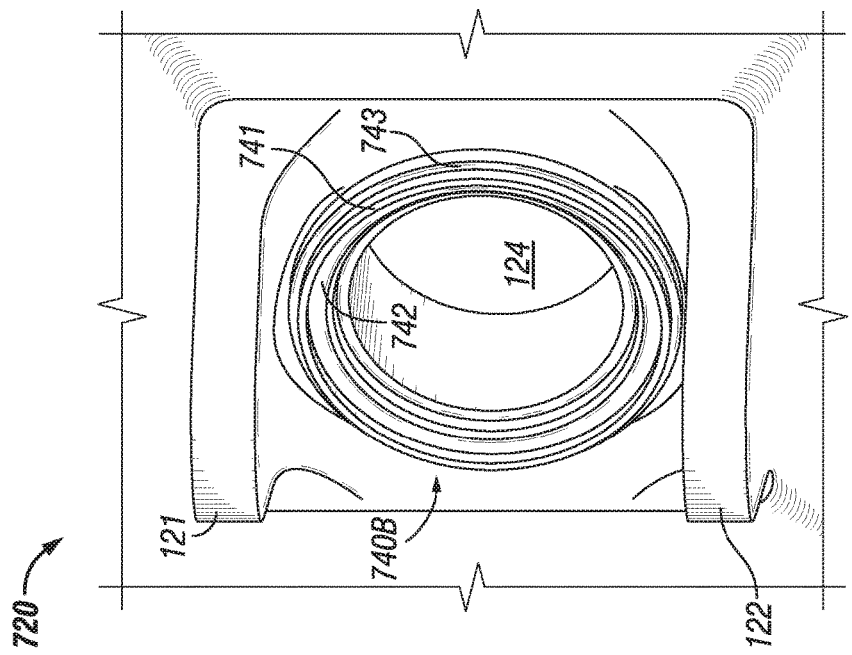
FIG. 11 is a close up view of an embodiment of a bushing having a mating feature inserted into a receiver.
Figure 10:
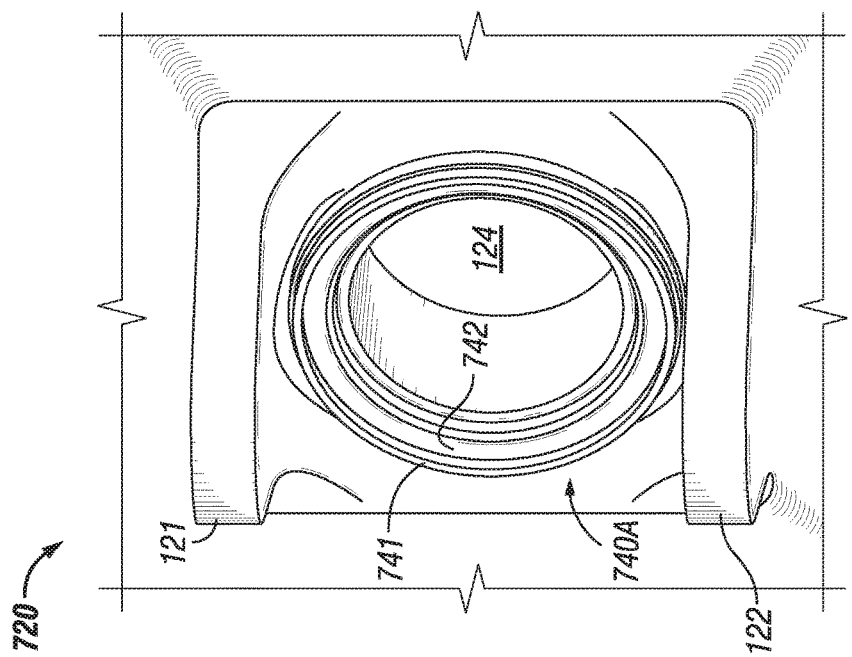
FIG. 10 is a close up view of an embodiment of a bushing having a mating feature inserted into a receiver.

FIG. 10 shows an embodiment of a receiver 720 that includes a first flange 121 and a second flange 122. The first and second flanges 121 and 122 each include an aperture to permit the insertion of a fastener to connect the receiver to a fuse pin as previously discussed herein in regards to FIG. 2 and FIG. 3. The receiver 720 includes an opening 124 for the insertion of a bushing 740A as shown in FIG. 11. The opening 124 also permits the insertion of the projection of a fuse pin as discussed previously in regards to FIGS. 2-4. The bushing 740A includes a mating feature 741 that is configured to mate with a specific fuse pin while preventing the insertion of a different fuse pin as is discussed in detail herein. As shown in FIG. 10, the mating feature 741 may be positioned close to and edge of the bushing 740A so that the bushing 740A may include a single shoulder 742 adjacent to the mating feature 741. The shoulder 742 may be positioned inside or outside of the mating feature 741 as would be appreciated by one of ordinary skill in the art having the benefit of this disclosure.

FIG. 11 shows an embodiment of a receiver 720 that includes a first flange 121 and a second flange 122. The first and second flanges 121 and 122 each include an aperture to permit the insertion of a fastener to connect the receiver to a fuse pin as previously discussed herein in regards to FIG. 2 and FIG. 3. The receiver 720 includes an opening 124 for the insertion of a bushing 740B as shown in FIG. 11. The opening 124 also permits the insertion of the projection of a fuse pin as discussed previously in regards to FIGS. 2-4. The bushing 740B includes a mating feature 741 that is configured to mate with a specific fuse pin while preventing the insertion of a different fuse pin as is discussed in detail herein. As shown in FIG. 11, the mating feature 741 may be positioned on the bushing 740B so that the bushing 740B may include two shoulders 742 and 743 on either side of the mating feature 741.

Figure 12:
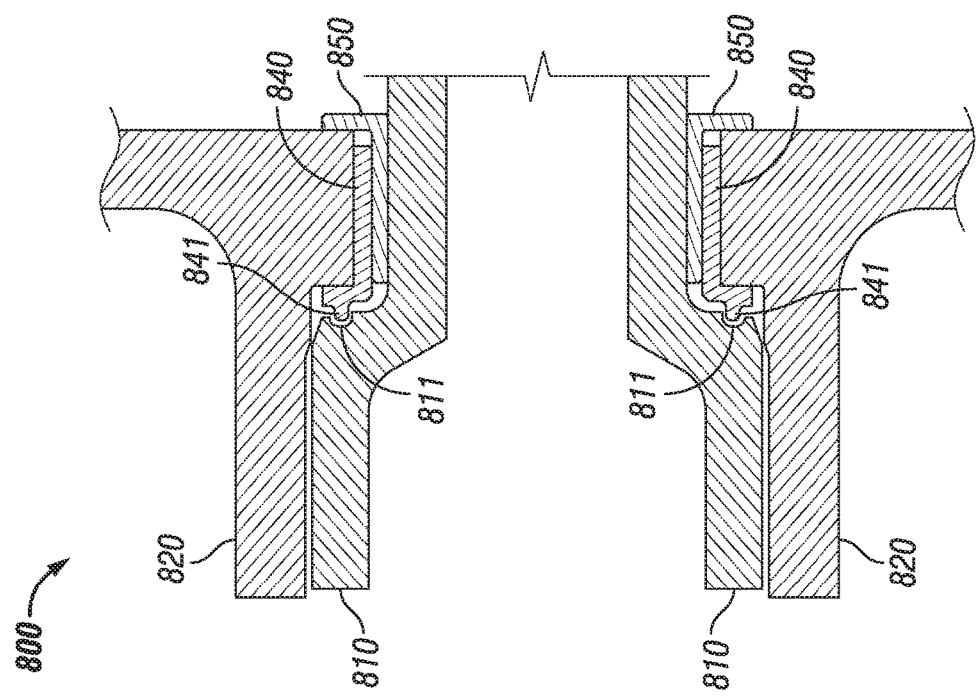
FIG. 12 is a schematic of a fastening system showing a fuse pin and bushing having a mating feature positioned within a receiver.

FIG. 12 shows a schematic of a fastener system 800 having differentiable components. The schematic shows a fuse pin 810 and a bushing 840 having a first mating feature 841 inserted into a receiver 820. The system 800 may include a wear bushing 850 positioned between the bushing 840 having a mating feature 841 and the fuse pin 810. The first mating feature 841 of the bushing 840 corresponds to a second mating feature 811 of the fuse pin 810 permitting the insertion of the fuse pin 810 into the receiver 820. The shape of the first mating feature 841 mirrors the shape of the second mating feature 811, which permits the complete insertion of the fuse pin 810 into the receiver 820.

Figure 13:
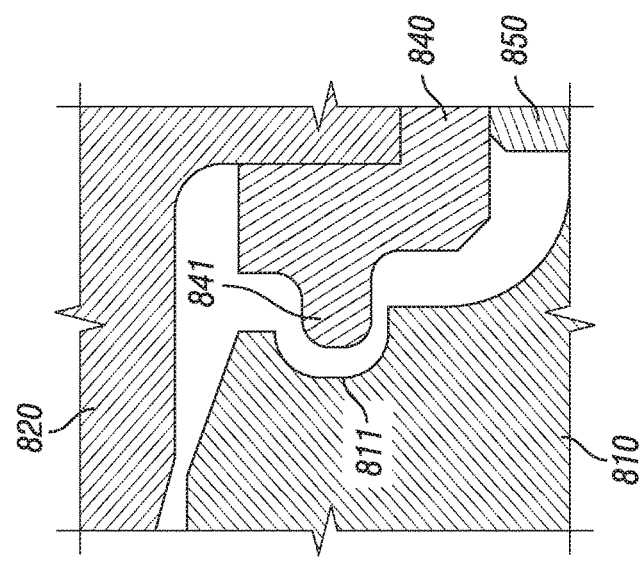
FIG. 13 is a close up view showing the mating features of the fuse pin and bushing of FIG. 12.

FIG. 13 shows a close up view of the first mating feature 841 of the bushing 840 positioned adjacent to the second mating feature 811 of the fuse pin 810. FIGS. 12 and 13 show that the first mating feature 841 of the bushing 840 as a projection and the second mating feature 811 of the fuse pin 810 as a recess for illustrative purposes only and may be varied as would be appreciated by one of ordinary skill in the art having the benefit of this disclosure. For example, the first mating feature 841 of the bushing 840 could be a recess and the second mating feature 811 of the fuse pin 810 could be a corresponding projection. Other shapes and variations may exist as would be appreciated by one of ordinary skill in the art having the benefit of this disclosure. For example, the bushing 840 could include a single projection, a circumferential projection, a divot, a ledge, or a recess with the fuse pin 810 having a corresponding feature.

Figure 14:
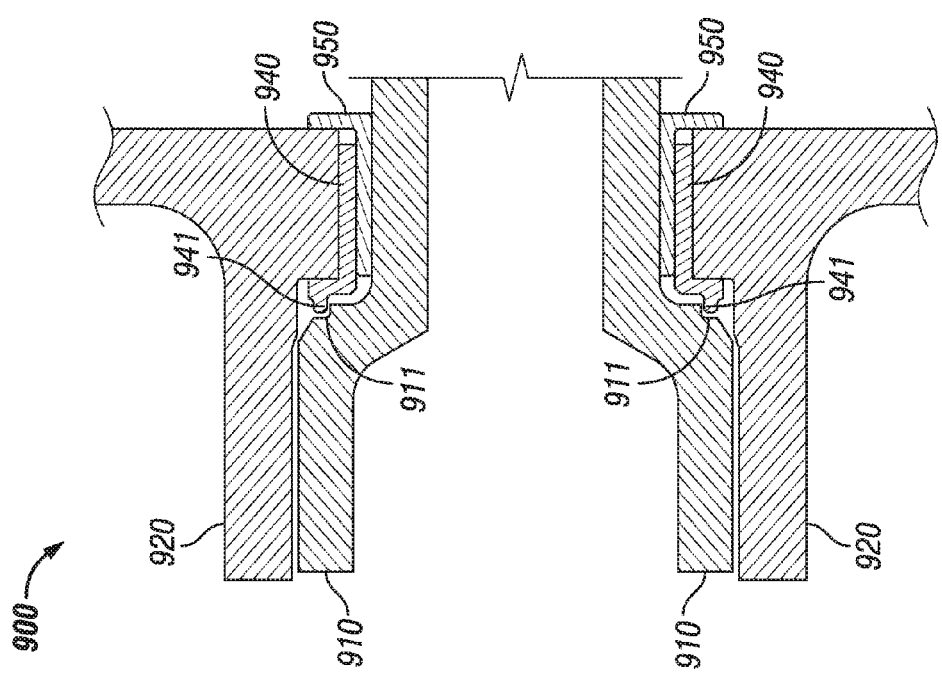
FIG. 14 is a schematic of a fastening system showing a fuse pin and bushing having a mating feature positioned within a receiver.

FIG. 14 shows a schematic of a fastener system 900 having differentiable components. The schematic shows a fuse pin 910 and a bushing 940 having a first mating feature 941 inserted into a receiver 920. The system 900 may include a wear bushing 950 positioned between the bushing 940 having a mating feature 941 and the fuse pin 910. The first mating feature 941 of the bushing 940 corresponds to a second mating feature 911 of the fuse pin 910 permitting the insertion of the fuse pin 910 into the receiver 920. The shape of the first mating feature 941 mirrors the shape of the second mating feature 911, which permits the complete insertion of the fuse pin 910 into the receiver 920.

Figure 15:
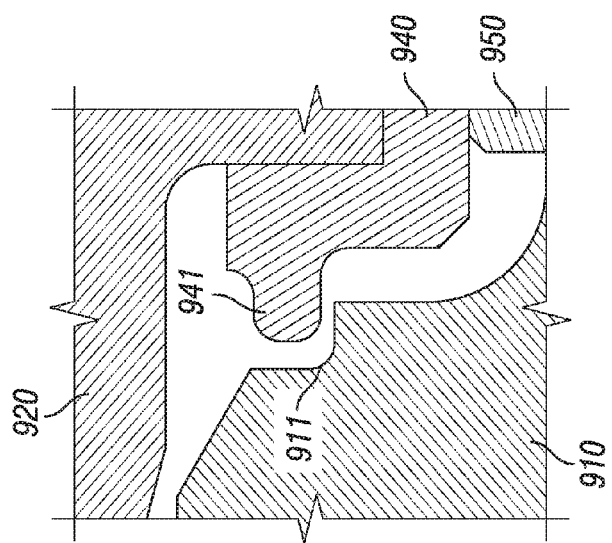
FIG. 15 is a close up view showing the mating features of the fuse pin and bushing of FIG. 14.

FIG. 15 shows a close up view of the first mating feature 941 of the bushing 940 positioned adjacent to the second mating feature 911 of the fuse pin 910. FIGS. 14 and 15 show that the first mating feature 941 of the bushing 940 as a projection and the second mating feature 911 of the fuse pin 910 as a shoulder for illustrative purposes only and may be varied as would be appreciated by one of ordinary skill in the art having the benefit of this disclosure. For example, the first mating feature 941 of the bushing 940 could be a shoulder and the second mating feature 911 of the fuse pin 910 could be a corresponding projection. Other shapes and variations may exist as would be appreciated by one of ordinary skill in the art having the benefit of this disclosure.

FIG. 16 shows a schematic of a fastener system 900 having differentiable components. The left side of the schematic shows a fuse pin 910 and a bushing 940 having a first mating feature 941 inserted into a receiver 920. As shown, the system 900 may include a wear bushing 950 positioned between the bushing 940 having a mating feature 941 and the fuse pin 910. The first mating feature 941 of the bushing 940 corresponds to a second mating feature 911 of the fuse pin 910 permitting the insertion of the fuse pin 910 into the receiver 920. The shape of the first mating feature 941 mirrors the shape of the second mating feature 911, which permits the complete insertion of the fuse pin 910 into the receiver 920. The complete insertion of the fuse pin 910 into the receiver 920 aligns openings in the fuse pin 910 and the receiver 920 as indicated by centerline 921 permitting the insertion of a fastener 930 through the fuse pin 910 and the receiver 920.

The right side of the schematic of FIG. 16 shows the wrong bushing 840 having a first mating feature 841 along with the correct fuse pin 910 inserted into the receiver 920. As the bushing 840 is the incorrect bushing for the receiver 920, the first mating feature 841 of the bushing 840 does not correspond to the second mating feature 911 of the fuse pin 910. Thus, the fuse pin 910 cannot be completely inserted into the receiver 920. The incomplete insertion of the fuse pin 910 into the receiver 920 does not align the opening in the fuse pin 910 with the opening in the receiver 920 as indicated by centerline 912 of the fuse pin 910 in comparison to the centerline 921 of the receiver 920. Thus, the fastener 930 cannot be inserted into the fuse pin 910 and receiver 920 openings. Although FIG. 16 shows the wrong bushing 840 preventing the complete insertion of the correct fuse pin 910, the correct bushing 940 would also prevent the complete insertion of the wrong fuse pin as would be appreciated by one of ordinary skill in the art having the benefit of this disclosure. The use of a fuse pin and bushing having mating features may ensure that the proper components are used to fasten the system together.

Figure 17:
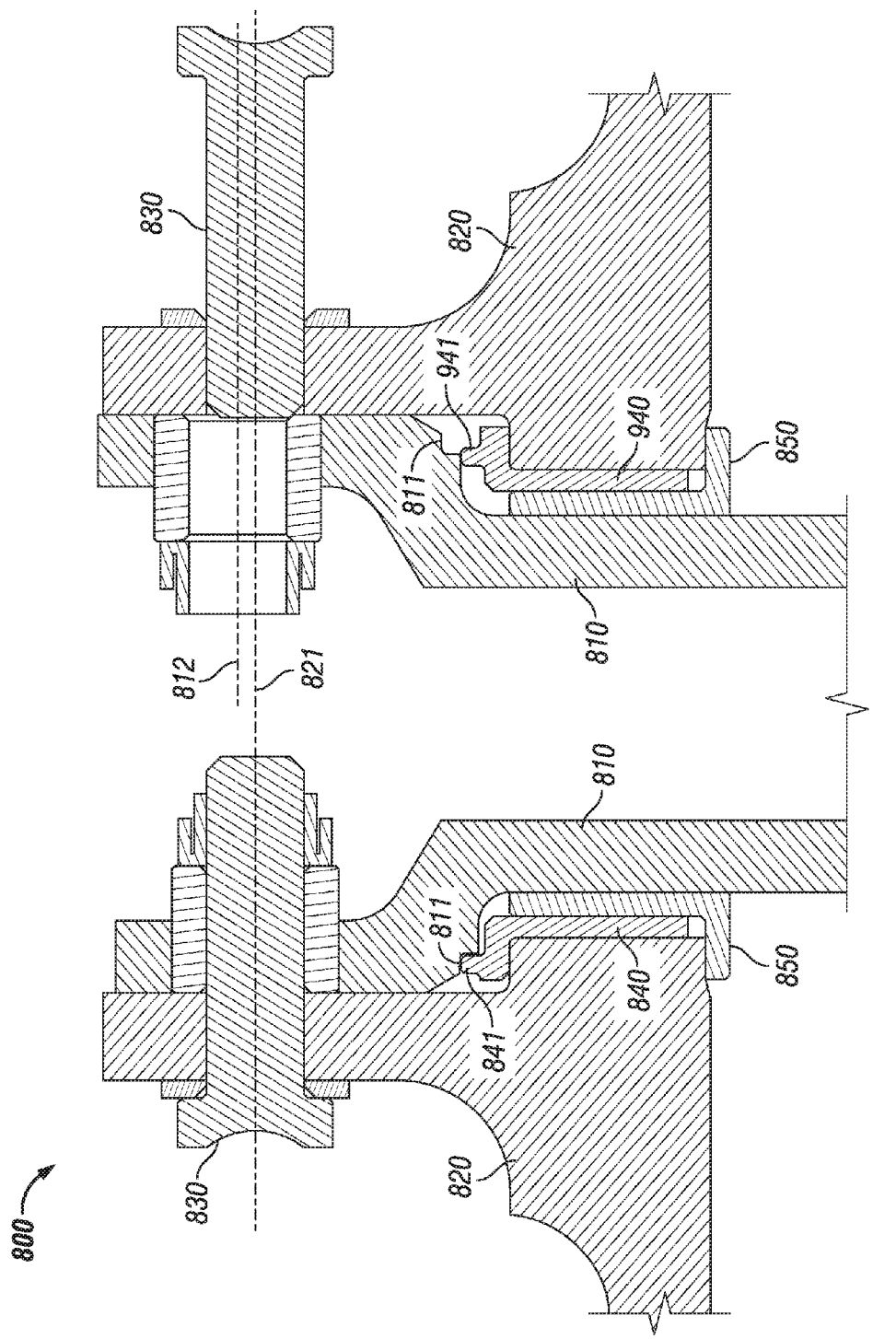
FIG. 17 is a schematic of a fastening system showing the mating features permitting and preventing the insertion of a fuse pin into a receiver.

FIG. 17 shows a schematic of a fastener system 800 having differentiable components. The left side of the schematic shows a fuse pin 810 and a bushing 840 having a first mating feature 841 inserted into a receiver 820. As shown, the system 800 may include a wear bushing 850 positioned between the bushing 840 having a mating feature 841 and the fuse pin 810. The first mating feature 841 of the bushing 840 corresponds to a second mating feature 811 of the fuse pin 810 permitting the insertion of the fuse pin 810 into the receiver 820. The shape of the first mating feature 841 mirrors the shape of the second mating feature 811, which permits the complete insertion of the fuse pin 810 into the receiver 820. The complete insertion of the fuse pin 810 into the receiver 820 aligns openings in the fuse pin 810 and the receiver 820 as indicated by centerline 821 permitting the insertion of a fastener 830 through the fuse pin 810 and the receiver 820.

The right side of the schematic of FIG. 17 shows the wrong bushing 940 having a first mating feature 941 along with the correct fuse pin 810 inserted into the receiver 820. As the bushing 940 is the incorrect bushing for the receiver 820, the first mating feature 941 of the bushing 940 does not correspond to the second mating feature 811 of the fuse pin 810. Thus, the fuse pin 810 cannot be completely inserted into the receiver 820. The incomplete insertion of the fuse pin 810 into the receiver 820 does not align the opening in the fuse pin 810 with the opening in the receiver 820 as indicated by centerline 812 of the fuse pin 810 in comparison to the centerline 821 of the receiver 820. Thus, the fastener 830 cannot be inserted into the fuse pin 810 and receiver 820 openings. Although FIG. 17 shows the wrong bushing 940 preventing the complete insertion of the correct fuse pin 810, the correct bushing 840 would also prevent the complete insertion of the wrong fuse pin as would be appreciated by one of ordinary skill in the art having the benefit of this disclosure. The use of a fuse pin and bushing having mating features may ensure that the proper components are used to fasten the system together Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A fastening system having differentiable components, the system comprising:
    a first bushing having a first mating feature positioned within an opening of a first receiver; and
    a first fuse pin configured to shear upon an application of a first predetermined load, the first fuse pin having a second mating feature, the first and second mating features comprise a projection on a surface of the first bushing and a recess on a surface of the first fuse pin;
    wherein the second mating feature corresponds to the first mating feature to permit insertion of the first fuse pin into the first bushing within the first receiver to selectively connect a first component to a second component, wherein the first bushing is positioned between the first fuse pin and the first receiver.

2. The system of claim 1, wherein the first and second components are parts of an aircraft.

3. The system of claim 2, wherein the first component further comprises a dog house assembly and the second component further comprises a gear beam.

4. The system of claim 1, wherein insertion of the first fuse pin into the first receiver aligns a plurality of apertures in the first fuse pin with a plurality of apertures in the first receiver.

5. The system of claim 4, further comprising a plurality of fasteners inserted through the apertures of the first fuse pin and the first receiver to selectively connect the first fuse pin to the first receiver.

6. The system of claim 1, further comprising a second fuse pin configured to shear upon an application of a second predetermined load, the second fuse pin having a third mating feature, wherein the third mating feature of the second fuse pin and the first mating feature of the first bushing prevents insertion of the second fuse pin into the first bushing within the first receiver to selectively connect the first component to the second component.

7. The system of claim 6, wherein the second predetermined load differs from the first predetermined load.

8. The system of claim 6, wherein the first fuse pin is configured to selectively connect together components of a first aircraft and the second fuse pin is configured to selectively connect together components of a second aircraft, the second aircraft and the first aircraft not being identical.

9. The system of claim 6, further comprising a second bushing having a fourth mating feature positioned within an opening of a second receiver, wherein the fourth mating feature corresponds to the third mating feature to permit insertion of the second fuse pin into the second bushing within the second receiver to selectively connect two components.

10. The system of claim 9, wherein the second mating feature of the first fuse pin and the fourth mating feature of the second bushing prevents insertion of the first fuse pin into the second bushing within the second receiver to selectively connect two components.

11. A method of providing a fastening system having differentiable components comprising:
    providing a first bushing;
    providing a first receiver configured to receive the first bushing;
    providing a first fuse pin, the first fuse pin configured to shear upon an application of a first predetermined load, wherein the first bushing positioned within the first receiver is configured to receive the first fuse pin, and wherein the first bushing is configured to be positioned between the first receiver and the first fuse pin;
    varying a feature on the first bushing with respect to the same feature on a second bushing;
    varying a feature of the first fuse pin to correspond with the feature varied on the first bushing, the features on the first bushing and the first fuse pin comprise a projection on a surface of the first bushing and a corresponding recess on a surface of the first fuse pin, wherein the first fuse pin may be inserted into the first bushing.

12. The method of claim 11, further comprising inserting the first fuse pin into the first bushing within the first receiver to selectively connect together a first component and a second component.

13. The method of claim 12, wherein the first and second components are parts of an aircraft.

14. The method of claim 12, wherein the insertion of the first fuse pin into the first bushing positioned within the first receiver aligns a plurality of apertures of the first fuse pin with a plurality of apertures of the first receiver and further comprising inserting a plurality of fasteners through the plurality of apertures to selectively connect the first fuse pin to the first receiver.

15. The method of claim 11, further comprising:
    providing a second fuse pin, the second fuse pin configured to shear upon an application of a second predetermined load, the second predetermined load differing from the first predetermined load; and
    varying a feature on the second fuse pin, wherein the varied feature prevents insertion of the second fuse pin into the first bushing to selectively connect together a first component and a second component.

16. The method of claim 11, wherein the projection of the first bushing fits within the recess of the first fuse pin when the first fuse pin is inserted into the first bushing.

17. The method of claim 11, wherein the recess on the surface of the first fuse pin is within a shoulder wherein the projection of the first bushing mates with the recess within the shoulder of the first fuse pin when the first fuse pin is inserted into the first bushing.

18. The method of claim 11, further comprising:
    providing a second bushing;
    providing a second receiver configured to receive the second bushing;

wherein the varied feature on the second bushing prevents insertion of the first fuse pin into the second bushing positioned within the second receiver.

19. A fastening system having differential components, the system comprising:
- a first bushing, the first bushing having a first mating feature;
- a first fuse pin, the first fuse pin having a second mating feature, the first and second mating features comprise a projection on a surface of the first bushing and a recess on a surface of the first fuse pin;
- a first receiver configured to receive the first bushing within an opening, the first bushing configured to receive the first fuse pin, wherein the first bushing is configured to be positioned between the first receiver and the first fuse pin; and
- a second fuse pin, the second fuse pin having a third mating feature comprising a recess on a surface of the second fuse pin;

wherein the second mating feature corresponds to the first mating feature to permit insertion of the first fuse pin into the first bushing within the first receiver to selectively connect a first component to a second component;

wherein the third mating feature in combination with the first mating feature prevents the insertion of the second fuse pin into the first bushing within the first receiver to selectively connect the first component to the second component.

20. The system of claim 19 further comprising:
- a second bushing, the second bushing having a fourth mating feature;
- a second receiver configured to receive the second bushing within an opening, the second bushing configured to receive the second fuse pin;

wherein the third mating feature of the second fuse pin corresponds to the fourth mating feature of the second bushing to permit insertion of the second fuse pin into the second bushing within the second receiver to selectively connect two components;

wherein the fourth mating feature of the second receiver in combination with the second mating feature of the first fuse pin prevents insertion of the first fuse pin into the second bushing within the second receiver.

* * * * *